United States Patent
Baumann et al.

(10) Patent No.: US 7,003,392 B2
(45) Date of Patent: Feb. 21, 2006

(54) DAMPING SYSTEM USING A LOLIMOT MODEL TO COUNTERACT DRIVE TRAIN OSCILLATIONS

(75) Inventors: Julian Baumann, Karlsruhe (DE); Thomas Schlegl, Regensburg (DE); Dara Daniel Torkzadeh, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/983,004

(22) Filed: Nov. 5, 2004

(65) Prior Publication Data
US 2005/0102090 A1 May 12, 2005

(30) Foreign Application Priority Data
Nov. 7, 2003 (DE) ................ 103 51 957

(51) Int. Cl.
*F02D 45/00* (2006.01)

(52) U.S. Cl. .................................... 701/102

(58) Field of Classification Search ................ 701/102, 701/110, 115, 114; 477/176; 123/406.23, 123/406.24, 436
See application file for complete search history.

(56) References Cited

U.S. PATENT DOCUMENTS

| | | | | |
|---|---|---|---|---|
| 4,978,324 A | * | 12/1990 | Casse | 464/68.3 |
| 4,986,401 A | * | 1/1991 | Petzold et al. | 477/176 |
| 6,035,827 A | * | 3/2000 | Heinitz et al. | 123/436 |

* cited by examiner

*Primary Examiner*—Hieu T. Vo
(74) *Attorney, Agent, or Firm*—Baker Botts L.L.P.

(57) ABSTRACT

A damping device comprises a recording device (4, 7) for determining a mechanical state variable ($\Delta\alpha_{MODELL}$, $\Delta\alpha_{IST}$) reflecting the torsion of a drive train (3) of an internal combustion engine (1), and a control device (2) for controlling an internal combustion engine (1) with a correcting variable as a function of the mechanical state variable ($\Delta\alpha_{MODELL}$, $\Delta\alpha_{IST}$). It is proposed that the mechanical state variable ($\Delta\alpha_{MODELL}$, $\Delta\alpha_{IST}$) be determined by a predictor element (4) that contains a model of the drive train (3) and/or of the internal combustion engine (1).

21 Claims, 2 Drawing Sheets

DAMPING SYSTEM USING A LOLIMOT MODEL TO COUNTERACT DRIVE TRAIN OSCILLATIONS

PRIORITY

This application claims priority to German application no. 103 51 957.2 filed Nov. 7, 2003.

1. Technical Field of the Invention

This invention relates to a damping device and a damping method.

2. Description of the Related Art

Technical improvements, particularly in the field of direct injection technology, have enabled the dynamics of performance development of internal combustion engines to be significantly enhanced. This has resulted in marked step changes in the load on vehicle drive trains, which these internal combustion engines use to drive said vehicles. Step changes in load represent a broad excitation in the frequency range for the drive train oscillatory system. As a result, low-frequency torque oscillations are triggered in the drive train. The inherent form of the lowest of these torque oscillations consists of an angular rotation of the engine toward the driven wheels. Such oscillation is particularly noticeable as lengthwise bucking of the vehicle and considerably reduces the drivability of the vehicle. Moreover, these oscillations—like the actual step changes in load—represent a high load for the drive train, resulting in increased wear and possibly causing material fatigue.

In a known method for suppressing oscillations and their negative effects, the oscillation is filtered out of a measuring signal recorded by an engine speed sensor in the internal combustion engine, and a counter-torque is applied to the oscillation by the internal combustion engine. In order to achieve this, the signal recorded by the engine speed sensor is filtered with a low pass and shifted out of phase.

The disadvantage of the described method, however, is that it must be operated close to the stability limits in order to be effective. This is particularly problematic in that the damping torque moment is applied with a frequency that corresponds to the torque resonance frequency. As a result, even minor errors in calculation of the counter-torque or minor variations in the mechanical behavior of the drive train may sometimes cause instability. It is important to remember that the mechanical properties of the drive train generally alter over the lifetime of a vehicle, for example due to wear on gearwheels or a change in the elastic properties of shaft couplings. A further disadvantage of the method is that only oscillations that already exist can elicit a response, and therefore the damping is only initiated if the high load for the drive train is already present.

SUMMARY OF THE INVENTION

An object of the invention, therefore, is to suppress oscillations in the drive train with the minimum of expenditure, whereby high loads on the drive train and bucking movements of the vehicle are to be avoided in particular.

The object can be achieved by a damping device for suppressing torsional oscillations in the drive train of an internal combustion engine, comprising a recording device for determining a mechanical state variable reflecting the torsion of the drive train and a control device for controlling the internal combustion engine with a correcting variable as a function of the state variable determined, wherein the recording device has a predictor element that contains a model of the drive train and/or of the internal combustion engine and determines the state variable as the response of the drive train and/or of the internal combustion engine to the correcting variable using the model, said model having adaptable model parameters.

The object can also be achieved by an engine controller with such a damping device. The object can furthermore be achieved by a damping method for suppressing torsional oscillations in the drive train of an internal combustion engine, comprising the steps of calculating a mechanical state variable reflecting the torsion of the drive train, controlling of the internal combustion engine with a correcting variable as a function of the state variable determined, and determining of the state variable as the response to the correcting variable on the basis of a model of the drive train and/or of the internal combustion engine, said model having adaptable model parameters.

The invention is based on the physical knowledge that the internal combustion engine, the drive train or the engine speed sensor has a dead time, which hampers the control of damping torque moments for the purpose of suppressing torque oscillations in the drive train. For example, an increase in fuel supply does not immediately result in an increased driving torque in the internal combustion engine, since injection of the fuel quantity into the combustion chambers is timed and delays occur as a result.

An advantage of the invention, therefore, is that it incorporates a predictor element for determining a mechanical state variable for the drive train in response to a correcting variable. The advantage of this is that the correcting variable can be defined depending on the mechanical state variable determined and the internal combustion engine is controlled with the correcting variable that has been thus modified. In this way even the excitation of torque oscillations is suppressed.

The correcting variable for the internal combustion engine may, for example, be the fuel quantity supplied to the internal combustion engine. However, it is also possible to influence other correcting variables, such as—for example—the throttle valve setting.

The mechanical state variable preferably reflects the temporal change in torsion of the drive train, so that torque oscillations can be clearly differentiated from the other loads normally encountered during operation.

The device according to the invention preferably takes into account the set transmission ratio of the gearbox and other transmissions in the drive train. This enables the damping device to incorporate a signal input in order to record a signal reflecting the transmission ratio of the gearbox.

The predictor element preferably has a model of the internal combustion engine and of the drive train in order to calculate the mechanical state variable. The advantage of a model is that it enables the mechanical response to predefined steering actions to be arithmetically predicted.

Preferably, the model contained in the predictor element is essentially free of dead time. The advantage of this is that it saves time, since the internal combustion engine, in particular, has a dead time due to the combustion process. If the actual response of the drive train to the correcting variable is awaited before any control intervention, then—during the dead time that elapses—further oscillation—exciting pulses can be produced by the correcting variable, without this being prevented by the controls. If, on the other hand, the response is calculated promptly, i.e. as quickly as the arithmetic unit of the model allows, then torque oscillations can be suppressed right at the initial stage, or the excitation of torque oscillations can be suppressed. The drive train or the engine speed sensor may also have a dead time.

Advantageously, the model of the predictor element has adaptable model parameters. The advantage of this is that the model can be adapted if the mechanical properties of the internal combustion engine, drive train or vehicle vary. For example, the drive train may alter its mechanical properties over the lifetime of the vehicle due to the appearance of wear, or the mass of the vehicle may be altered as a result of the loading of the vehicle. The damping device therefore ideally has an adaptor unit for adapting the model parameters during the journey. This enables the model to be adapted, at any time, to altered mechanical properties. It is also possible to alter the parameters depending on speed, for example to take into account a higher air resistance. In an advantageous embodiment of the invention, the adaptor unit supports the model statuses. The adaptor unit can thus use measurement values that are measured in the vehicle anyway, such as—for example—the rotational speed of the internal combustion engine or of the driven wheels. In this way, faults and model inaccuracies can be corrected immediately, thus increasing the prediction quality of the predictor element.

In an advantageous embodiment of the invention, a multiple mass oscillator model represents the internal combustion engine and the drive train with the vehicle mass in the model. In this model—depending on the required model accuracy—two, three, four or more model masses can be linked to one another by spring/damper elements. The advantage of this is that the oscillatory system can be mapped from internal combustion engine, drive train and vehicle mass in a simplified yet realistic way.

In order to record the initial inherent form of torque oscillation for the drive train, a dual-mass torque oscillator model is advantageously used as the mass oscillator model. The dual-mass torque oscillator model incorporates two mass moments of inertia and a spring/damper element that links these mass moments of inertia. The spring/damper element consists of a torsion spring and a torsion damper. It is also possible, however, to arrange only one torsion spring and to leave the damping of the drive train out of consideration, whereby the model would be simplified. This is particularly advantageous if the damping actions on the drive train are very minor. The first mass moment of inertia preferably represents the moving parts of the internal combustion engine, for example the crankshaft, the connecting rods and the pistons. The wheels and the vehicle mass are modeled with the second mass moment of inertia, whereby the vehicle mass is entered into the calculation of the mass moment of inertia with a radius of gyration which is essentially the same as the radius of the wheels. The model takes into account, in each case, the set transmission ratio of the gearbox. Alternatively, it is also possible to introduce further mass moments of inertia into the model in addition, for example for the gearbox, as a result of which the prediction accuracy of the model may be increased.

Advantageously, the model parameters are constants of the mass moments of inertia or of the spring/damper elements. Thus a model parameter can reflect the value of one mass moment of inertia, the other model parameter can reflect the value of the other mass moment of inertia, a third model parameter can reflect the torsion spring constant of the drive train, and a fourth model parameter can reflect the torsion damping constant of the drive train. In combination with the adaptor unit for adapting the model parameters, the dual-mass torque oscillator model can thus be adapted to the altered mechanical properties of the drive train and of other components. Thus, for example, the mass moment of inertia that models the wheels with the vehicle mass, can be increased by a corresponding amount if the load on the vehicle is increased. The advantage of this is that the prediction accuracy of the model is not adversely affected by a variation in the vehicle mass. Furthermore, it is possible that the spring stiffness of the drive train might alter over the lifetime of the vehicle. In such a case the adaptor unit can be used advantageously to adapt the torsion spring constant of the drive train to the altered mechanical properties. In addition, the adaptor unit can also be used to adapt the torsion damper constant to altered mechanical properties. In a further advantageous embodiment the model parameters are defined as a function of the set transmission ratio of the drive train. Advantageously, a set of model parameters is stored in a memory for each transmission ratio. If the transmission ratio changes, any model parameters of the latest transmission ratio that were adapted are saved again. The advantage of this is that the predictor element has a suitable model available immediately if the transmission ratio changes.

In a further preferred embodiment, the model contained in the predictor element is a LOLIMOT (Local Linear Model Tree) model, which represents the mechanical behavior of the internal combustion engine or of the drive train with vehicle mass using predefined linear mapping functions. For example, the torque rotational speeds of the internal combustion engine and wheels and the predefined torque of the internal combustion engine can be used as input variables for the LOLIMOT model. Alternatively, other variables could also be used—for example the fuel supply to the internal combustion engine or the throttle valve setting. The LOLIMOT model preferably calculates, from the input variables, a predicted difference in the angular rotation speeds of the internal combustion engine and of the wheels, or another variable reflecting the drive train torque. The LOLIMOT model thus links a plurality of linear mapping functions that reflect the sometimes virtually linear behavior of the internal combustion engine and drive train.

Advantageously, the LOLIMOT model has weighting functions which are assigned to the individual mapping functions. The weighting functions may, for example, be normal Gaussian distributions with which the linear mapping functions are multiplied. LOLIMOT models with linear mapping functions and weighting functions are described in greater detail in the publication "Local Linear Model Trees (LOLIMOT) Toolbox for Nonlinear System Identification" by O. Nelles et al. ($12^{th}$ IFAC Symposium on System Identification, St. Barbara, USA, 2000), the content of which is therefore to be ascribed to this application. The combination of linear mapping functions and weighting functions firstly enables the model to be easily adapted to the actual mechanical properties and, secondly, provides advantages with regard to computing speed, since no compute-intensive non-linear equations need to be calculated.

The weighting function preferably has parameters that can be adapted as model parameters, for example by the adaptor unit. This enables the weighting of the individual linear mapping functions to be adapted. A further advantage is that the selectivity of the individual weighting functions can be varied, thus enabling the model to be better adapted to reality in some circumstances.

Advantageously, the parameters of the linear mapping functions of the LOLIMOT model are adapted as model parameters by the adaptor unit. This may, for example, be effected by means of a regression algorithm as described in the aforementioned publication by O. Nelles et al. Furthermore, it would also be possible to generate further mapping functions and weighting functions within the adaptation process, in order to adapt the model better to the mechanical behavior of the drive train.

The invention also incorporates an engine controller with a damping device in one of the described embodiments. Such an engine controller is particularly suitable for controlling the internal combustion engine so as to avoid the peak loads and lengthwise bucking movements of the vehicle that result in increased wear.

BRIEF DESCRIPTION OF THE DRAWINGS

The invention further incorporates a damping method, which may be implemented—for example—using one of the damping devices described.

The invention is described in greater detail below, with the help of the attached diagrams. In these.

DETAILED DESCRIPTION OF THE PREFERRED EMBODIMENTS

Figure 1:
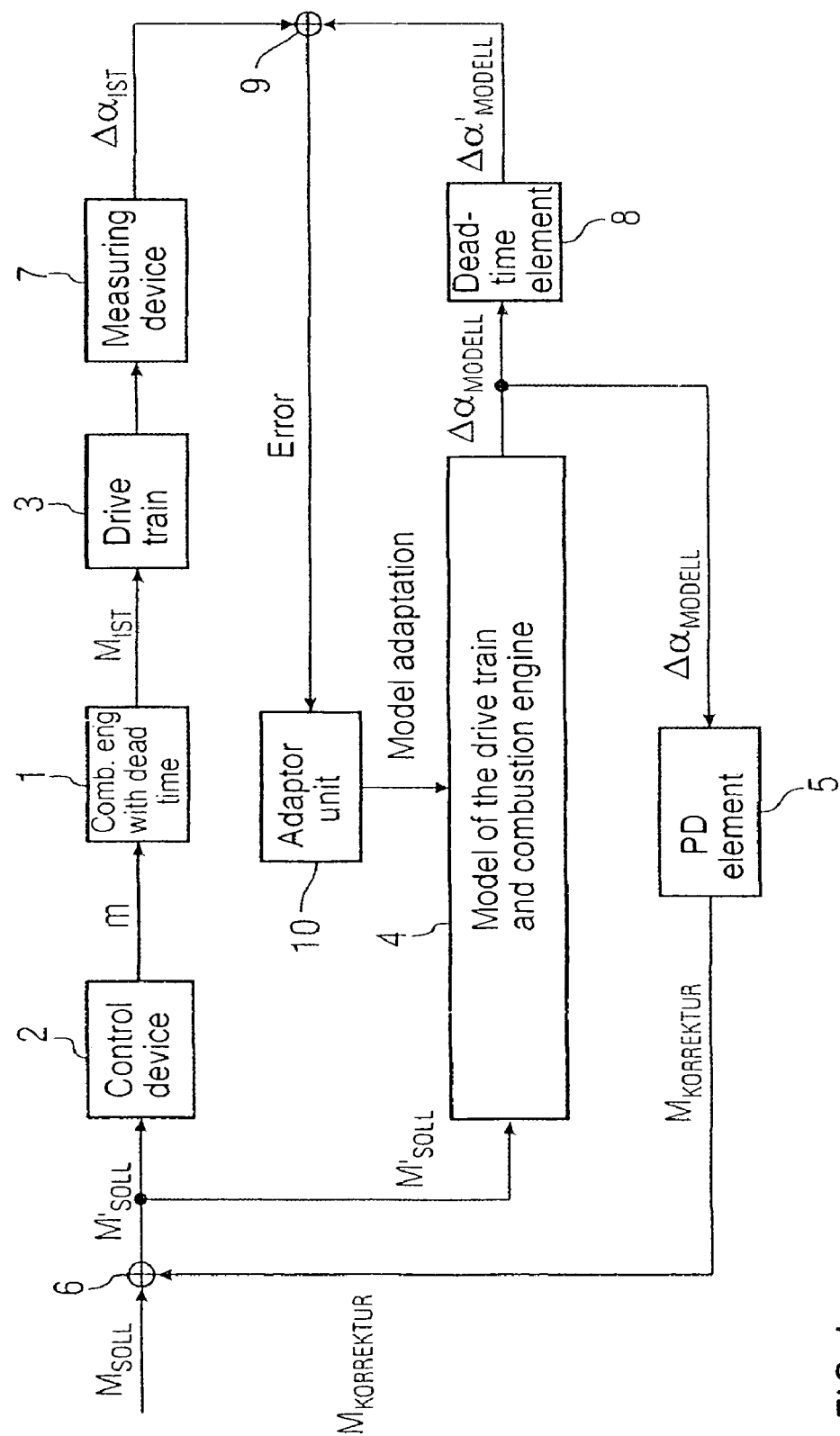
FIG. 1 is a schematic diagram showing a damping device according to the invention.

FIG. 1 is a schematic diagram showing an equivalent circuit diagram used in control engineering, in which an internal combustion engine 1 is controlled by a control device 2. The diagram shows that the correcting variable with which the internal combustion engine 1 is controlled by the control device 2 is the fuel quantity m of an injection process. The control device 2 may, in fact, actually control further parameters of the internal combustion engine 1, for example the throttle valve setting.

The internal combustion engine 1 drives the wheels of a vehicle via a drive train 3. The drive train 3 incorporates several shafts, a gearbox, a differential and articulations for torque transmission between the individual components. The drive train 3 is driven by the internal combustion engine 1 with the torque $M_{IST}$.

The control device 2 sets the fuel quantity m to be injected according to the parameters of the driving torque $M'_{SOLL}$ of the internal combustion engine 1. For this purpose the control device 2 uses a control method, which—in various embodiments—is commonly known to persons skilled in the art.

The damping device incorporates a predictor element 4, which contains a model of the internal combustion engine 1 and of the drive train 3. The model is a torsional oscillator with two mass moments of inertia and a torsion spring damper element between the two mass moments of inertia. A mass moment of inertia here corresponds to the mass moment of inertia of the moving parts of the internal combustion engine 1. The torsion spring damper element represents the drive train 3 with its components. The second mass moment of inertia of the model corresponds to the driven wheels and the mass of the vehicle, which are entered in the calculation of the second mass moment of inertia with a radius of gyration that corresponds to the radius of the wheels. $M'_{SOLL}$ is applied to the model as the load torque. The predictor element 4 calculates from this, on the basis of the model, the angular velocity of the shaft of the internal combustion engine 1, to which the drive train 3 is connected, and the angular velocity of the driven wheels. For this purpose, the model takes into account the set transmission ratio of the gearbox. The output of the predictor element 4 contains a signal that indicates the difference $\Delta \alpha_{MODELL}$ between the described angular velocities.

The difference $\Delta \alpha_{MODELL}$ corresponds to the temporal change in the torsion of the drive train 3 between the internal combustion engine 1 and the driven wheels. In order to suppress a torsional oscillation as effectively as possible, a damping torque moment $M_{KORREKTUR}$ is calculated by a PD element 5 according to a conventional mechanical damping process, according to the difference $\Delta \alpha_{MODELL}$ which reflects the temporal change in torsion. The PD element 5 corresponds to a PD controller that is known per se, whereby the key figures for the proportional and the differential component are adapted in trials. In this case a greater D-proportion has a stabilizing effect.

The correction torque $M_{KORREKTUR}$ calculated by the PD element 5 is added to a torque $M_{SOLL}$ of the internal combustion engine 1 predefined by the driver, in an adding device 6. The result of this addition is the torque $M'_{SOLL}$, which represents the input signal for the control device 2 and the predictor element 4. Increasingly improved torque parameters $M'_{SOLL}$ may be calculated in detail in this circuit through several iterative steps.

The illustrated damping device therefore suppresses, in particular, very forceful torsional oscillations in the drive train 3, since it is not critical to stability in the same way as a control process because of dead times in the control cycle. This is because the internal combustion engine 1 has a dead time that is caused mainly by the combustion process. The dead time of the internal combustion engine 1 is about 40 ms at an engine speed of 800 revolutions per minute (rpm). The dead time is indirectly proportional to the engine speed. Because of this dead time, measurement of the mechanical response of the drive train 3 and of the internal combustion engine 1 to the correcting variable m of the control device 2 is only possible after said dead time.

On the other hand, the predictor element 4 with the model of the drive train 3 and of the internal combustion engine 1 essentially has no dead time. The time interval after which the response to the input variable $M'_{SOLL}$ is present at the signal output of the predictor element 4, depends only on the computing speed of the predictor element 4. The time interval when using conventional microelectronic components is far shorter than the dead time of the internal combustion engine 1. Prompt calculation of a correction moment $M_{KORREKTUR}$ is therefore possible.

In order to check the prediction quality and for the purpose of any model adaptation of the model by the predictor element 4, a measuring device 7 is used to measure the actual temporal change $\Delta \alpha_{IST}$ in torsion of the drive train 3. The measuring device 7 incorporates an engine speed sensor in the internal combustion engine 1 which measures the rotational speed of the internal combustion engine 1, and rotational speed sensors on each of the driven wheels. The rotational speeds of the internal combustion engine 1 and of the wheels are normally measured in a vehicle anyway, for example in the context of traction control. The measuring device 7 calculates the temporal change $\Delta \alpha_{IST}$ in torsion of the drive train 3 from the signals of the individual rotational speed sensors. In order to compare this measured temporal change $\Delta \alpha_{IST}$ in torsion of the drive train 3 with the calculated temporal change $\Delta \alpha_{MODELL}$, it is necessary to defer the calculated state variable $\Delta \alpha_{MODELL}$ using a dead time element 8. The temporal change $\Delta \alpha'_{MODELL}$ in torsion of the drive train 3 calculated with the dead time element 8 and the predictor element 4 is compared in a comparator unit 9 with the measured temporal change $\Delta\alpha_{IST}$ in torsion of the drive train 3. The result of this comparison represents the error in the prediction of the predictor element 4. The error is used as an input variable for an adaptor unit 10, which has the task of adapting the model of the predictor element 4. This is done by adapting the parameters, for example the spring and damping constants of the dual-mass oscillator model. This guarantees that the predictor element 4 will continue accurately to predict the response of the drive train 3 to a driving torque $M'_{SOLL}$, even if the mechanical properties of the internal combustion engine 1 and drive train 3 have changed.

Figure 2:
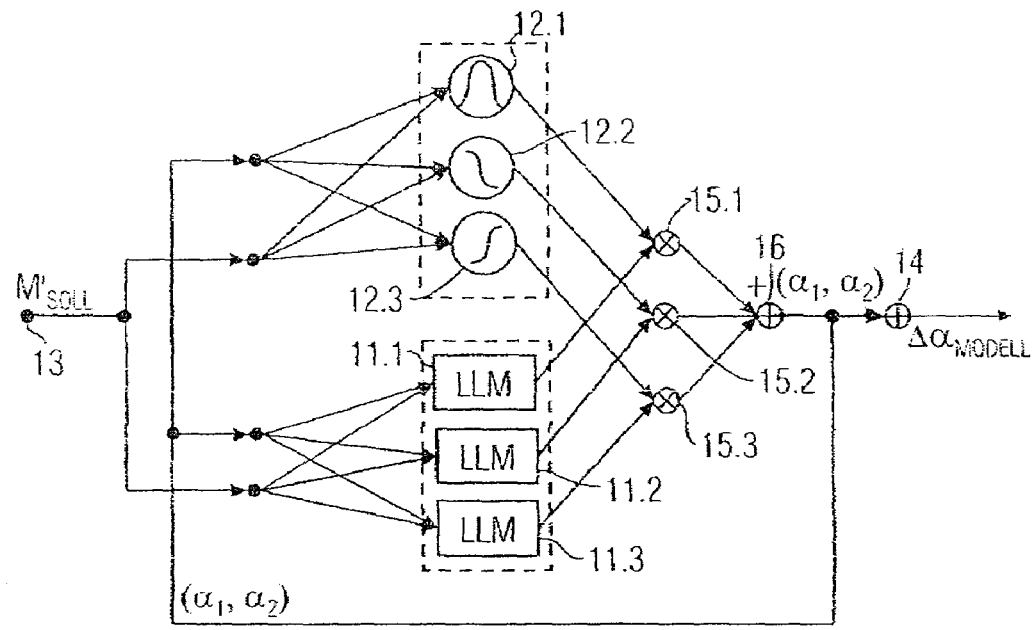
FIG. 2 is a schematic diagram showing a LOLIMOT model.

FIG. 2 is a schematic diagram showing the configuration of a possible embodiment of the LOLIMOT model contained in the predictor element 4. The LOLIMOT model illustrated consists of three local linear mapping functions (local linear models or LLMs) 11.1–11.3 and the weighting functions 12.1–12.3 pertaining to them. A signal which contains the predefined driving torque $M'_{SOLL}$ of the internal combustion engine is present at the input 13. The LOLIMOT model calculates the influence of the predefined driving torque $M'_{SOLL}$ on the oscillatory system of the drive train. Each of the local linear mapping functions 11.1–11.3 calculates a vector, the two components of which are the angular velocities $\alpha_1$, $\alpha_2$ of the internal combustion engine and of the driven wheels. The LOLIMOT model uses the vector of the angular velocities $\alpha_1$, $\alpha_2$ as the input signal since the mechanical behavior to be predicted of the drive train is dependent on the current angular velocities $\alpha_1$, $\alpha_2$. The difference between the two components of the vector of the angular velocities $\alpha_1$, $\alpha_2$ is calculated in a differential element 14. This difference corresponds to the temporal change $\Delta\alpha_{MODELL}$ in torsion of the drive train and is output at the LOLIMOT model output.

Different local linear mapping functions 11.1–11.3, whose proportion of the result is controlled by the weighting functions 12.1–12.3, exist in the LOLIMOT model for certain ranges of the state variables driving torque $M'_{SOLL}$ and angular rotation speeds $\alpha_1$, $\alpha_2$ of the internal combustion engine and of the wheels. The result of one of the local linear mapping functions 11.1–11.3 consisting of a vector with two components is multiplied in multiplier elements 15.1–15.3 by the scalar of the corresponding weighting function of the weighting functions 12.1–12.3. Thus the result of the local linear mapping function 11.1 is multiplied by the corresponding weighting function 12.1 in the multiplier element 15.1. The same applies for the local linear mapping functions 11.2 and 11.3 and the weighting function 12.2, 12.3 with the multiplier elements 15.2 and 15.3. The vectors of the weighted results are then summed up in a summation element 16. This total then represents the result of the LOLIMOT model calculation, said result incorporating the angular rotation speeds $\alpha_1$, $\alpha_2$ of the internal combustion engine and of the driven wheels.

In order to adapt the LOLIMOT model to the mechanical properties of the drive train, it is possible to vary the parameters of the weighting function, such as —for example—its filtering stringency and its integral value. Furthermore, the parameters of the local linear mapping function may be varied. It is also possible to add further local linear mapping functions and weighting functions to the LOLIMOT model. This may also be done automatically as described in the aforementioned publication by O. Nelles et al.

Figure 3:
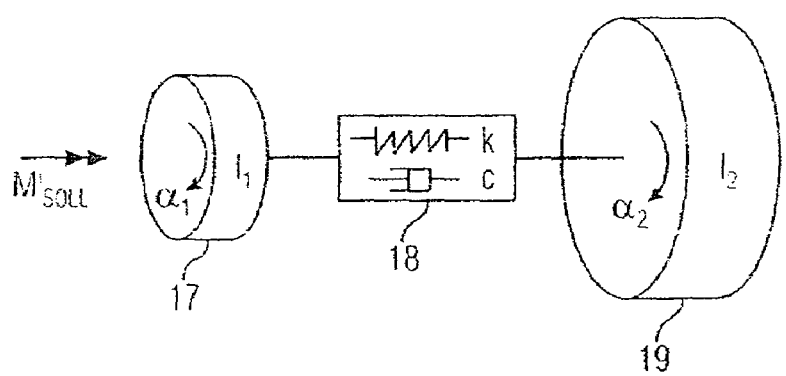
FIG. 3 is a schematic diagram showing a dual-mass torque oscillator model.

FIG. 3 shows a model of the drive train in the form of a dual-mass torque oscillator model with spring/damper element. This model is used in one embodiment according to the invention in order to determine the mechanical response of the drive train to a driving torque $M'_{SOLL}$. The dual-mass torque oscillator model consists of a smaller mass moment of inertia 17, which represents the rotational parts of the internal combustion engine and has the value $I_1$. The mass moment of inertia 17 rotates with the angular velocity of the internal combustion engine $\alpha'_1$. The first mass moment of inertia 17 is connected to a second mass moment of inertia 19 via a spring/damper element 18. The spring/damper element 18 consists of a torsion spring with the spring constant k and a torsion damper with the damping constant c. The second mass moment of inertia 19 has the value I2 and represents the wheels and the mass of the vehicle, whereby the mass of the vehicle is entered in the calculation of the mass moment of inertias 19 with a radius of gyration corresponding to the radius of the wheels. Furthermore, any existing transmission of the drive train must be taken into account when calculating the mass moment of inertias 19. Moreover, the angular velocity of the wheels $\alpha'_2$ is not the actual angular velocity of the wheels, but a multiple or a fraction of the actual angular velocity of the wheels according to the transmission ratio of the drive train.

A possible way of calculating the response of the model of the drive train to a predefined driving torque $M'_{SOLL}$ is to predict arithmetically the angular rotation speed of the internal combustion engine $\alpha'_1$ and of the wheels $\alpha'_2$ in a time stepping process. The difference between the two angular rotation speeds is then a measure of the torsion of the drive train.

The parameters of the model, which—in the illustrated case—are the first mass moment of inertia $I_1$, the second mass moment of inertia $I_2$, the torsion spring constant k and the damping constant c, can be defined beforehand or determined in trials. Thus, for example, the mass moment of inertia of the moving parts of the internal combustion engine is normally known. The mass moment of inertia 19 can be calculated from the mass of the vehicle and of the wheels, taking into account the transmission ratio of the drive train. It should be noted that the second mass moment of inertia 19 is dependent on the loading of the vehicle. If the two mass moments of inertia 17 and 19 are known, then the torsion spring constant k and the torsion damper constant c can be calculated, using the differential equation of the model, in trials and even in the traveling vehicle if there are changes in the predefined driving torque $M'_{SOLL}$. Like the LOLIMOT model illustrated in FIG. 2, this model also has—as definitive state variables—the predefined driving torque $M'_{SOLL}$, the angular rotation speed of the internal combustion engine $\alpha'_1$ and the angular rotation speed $\alpha'_2$ of the wheels, the latter having been corrected by the transmission ratio.

The invention is not limited to the exemplary embodiment described above and to the method described, but also incorporates other devices and methods insofar as such devices and methods make use of the inventive idea.

We claim:

1. An engine controller with a damping device for suppressing torsional oscillations in the drive train of an internal combustion engine, comprising:
   a recording device for determining a mechanical state variable reflecting the torsion of the drive train, and
   a control device for controlling the internal combustion engine with a correcting variable as a function of the mechanical state variable determine, wherein
   the recording device has a predictor element that contains a model of the drive train and/or of the internal combustion engine and determines the mechanical state variable as the response of the drive train and/or of the internal combustion engine to the correcting variable using the model, said model having adaptable model parameters.

2. A damping device for suppressing torsional oscillations in the drive train of an internal combustion engine, comprising:
a recording device for determining a mechanical state variable reflecting the torsion of the drive train, and
a control device for controlling the internal combustion engine with a correcting variable as a function of the mechanical state variable determined, wherein
the recording device has a predictor element that contains a model of the drive train and/or of the internal combustion engine and determines the mechanical state variable as the response of the drive train and/or of the internal combustion engine to the correcting variable using the model, said model having adaptable model parameters.

3. The damping device according to claim 2, wherein the model contained in the predictor element is essentially free of dead time, whereas the internal combustion engine and/or the drive train and/or a measuring device set up to record engine speed, however, do have a dead time.

4. The damping device according to claim 2, wherein an adaptor unit is provided for adapting the model parameters during the journey.

5. The damping device according to claim 2, wherein the model is a multiple mass oscillator model, with which the internal combustion engine and/or the drive train is modeled with a vehicle mass.

6. The damping device according to claim 5, wherein the multiple mass oscillator model is a dual-mass torque oscillator model, which incorporates two mass moments of inertia, said mass moments of inertia being connected to one another by a spring/damper element, whereby the first mass moment of inertia models moving parts of the internal combustion engine, while the second mass moment of inertia maps the wheels with vehicle mass, whereas the spring/damper element represents the drive train.

7. The damping device according to claim 6, wherein the model parameters are constants of the mass moments of inertia and/or of the spring/damper element.

8. The damping device according to claim 2, wherein the model is a LOLIMOT model, which represents the mechanical behavior of the internal combustion engine and/or of the drive train with vehicle mass, with predefined mapping functions.

9. The damping device according to claim 8, wherein the LOLIMOT model has weighting functions that are assigned to the individual mapping functions.

10. The damping device according to claim 9, wherein the model parameters are parameters of the weighting functions of the LOLIMOT model.

11. The damping device according to claim 8, wherein the model parameters are parameters of the linear mapping functions of the LOLIMOT model.

12. A damping method for suppressing torsional oscillations in the drive train of an internal combustion engine, comprising the steps of:
calculating a mechanical state variable reflecting the torsion of the drive train,
controlling of the internal combustion engine with a correcting variable as a function of the mechanical state variable determined, and
determining of the mechanical state variable as the response to the correcting variable on the basis of a model of the drive train and/or of the internal combustion engine, said model having adaptable model parameters.

13. The damping method according to claim 12, wherein the model is essentially free of dead time, whereas the internal combustion engine and/or the drive train and/or a measuring device set up to record rotational speed do have a dead time.

14. The damping method according to claim 12, wherein the model parameters are adapted during the journey.

15. The damping method according to claim 12, wherein with the model, the internal combustion engine and/or the drive train with a vehicle mass is modeled as a multiple mass oscillator model.

16. The damping method according to claim 15, wherein the multiple mass oscillator model is a dual-mass torque oscillator model, which incorporates two mass moments of inertia, said mass moments of inertia being connected to one another by a spring/damper element, whereby the first mass moment of inertia models moving parts of the internal combustion engine while the second mass moment of inertia maps the wheels with vehicle mass, whereas the spring/damper element represents the drive train.

17. The damping method according to claim 16, wherein the model parameters are constants of the mass moments of inertia and/or of the spring/damper element.

18. The damping method according to claim 12, wherein the model is a LOLIMOT model, which represents the mechanical behavior of the internal combustion engine and/or of the drive train with vehicle mass, with predefined mapping functions.

19. The damping method according to claim 18, wherein the LOLIMOT model has weighting functions that are assigned to the individual mapping functions.

20. The damping method according to claim 19, wherein the model parameters are parameters of the weighting functions of the LOLIMOT model.

21. The damping method according to claim 18, wherein the model parameters are parameters of the linear mapping functions of the LOLIMOT model.

* * * * *